(12) United States Patent
Suh et al.

(10) Patent No.: US 11,082,976 B2
(45) Date of Patent: *Aug. 3, 2021

(54) MULTIBAND SCHEDULING FOR WAKE UP RADIO

(71) Applicant: HUAWEI TECHNOLOGIES CO., LTD., Guangdong (CN)

(72) Inventors: Jung Hoon Suh, Ottawa (CA); Osama Aboul-Magd, Ottawa (CA); Kwok Shum Au, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/735,163

(22) Filed: Jan. 6, 2020

(65) Prior Publication Data

US 2020/0146005 A1    May 7, 2020

Related U.S. Application Data

(63) Continuation of application No. 15/928,953, filed on Mar. 22, 2018, now Pat. No. 10,531,454.

(Continued)

(51) Int. Cl.
*H04W 72/04* (2009.01)
*H04L 5/00* (2006.01)
(Continued)

(52) U.S. Cl.
CPC ...... *H04W 72/0446* (2013.01); *H04B 1/0082* (2013.01); *H04L 5/001* (2013.01);
(Continued)

(58) Field of Classification Search
None
See application file for complete search history.

(56) References Cited

U.S. PATENT DOCUMENTS 10,091,728 B2 * 10/2018 Yang ............... H04L 69/22
2014/0050133 A1    2/2014 Jafarian et al.
(Continued)

FOREIGN PATENT DOCUMENTS

| CN | 101742544 A | 6/2010 |
|---|---|---|
| CN | 104584649 A | 4/2015 |

(Continued)

OTHER PUBLICATIONS

Jianhan Liu (Mediatek Inc.):"On Waking-up Multiple WUR Stations", IEEE802.11-17-002810, Jan. 2017, total 6 pages.

(Continued)

*Primary Examiner* — Hong S Cho (57) ABSTRACT

Methods and systems for waking up a wireless receiving stations having wake-up radio (WUR) circuits. A method of providing a wake-up signal in a communications channel for a plurality of receiving stations, including generating at least a first series and a second series of waveform coded symbols, the first series being incorporated into a first wake-up-radio (WUR) frame that is intended for a first receiving station and has a first predefined bandwidth, the second series being incorporated into a second WUR frame that is intended for a second receiving station and has a second predefined bandwidth; combining the first and second WUR frames into a multiband WUR data unit having a bandwidth that is greater than a sum of the predefined bandwidths of the first and second WUR frames; and transmitting a wake-up signal including the multiband WUR data unit in the communications channel.

18 Claims, 8 Drawing Sheets

Related U.S. Application Data (60) Provisional application No. 62/486,607, filed on Apr. 18, 2017.

(51) Int. Cl.
*H04L 27/26* (2006.01)
*H04W 52/02* (2009.01)
*H04B 1/00* (2006.01)

(52) U.S. Cl.
CPC ...... *H04L 27/2601* (2013.01); *H04L 27/2613* (2013.01); *H04W 52/0235* (2013.01)

(56) References Cited

U.S. PATENT DOCUMENTS

| | | | |
|---|---|---|---|
| 2014/0269462 | A1 | 9/2014 | Zhanfeng et al. |
| 2016/0337973 | A1 | 11/2016 | Park et al. |
| 2016/0374020 | A1* | 12/2016 | Azizi ................ H04W 52/0229 |
| 2016/0381638 | A1 | 12/2016 | Min et al. |
| 2017/0280498 | A1* | 9/2017 | Min ...................... H04L 5/0053 |

FOREIGN PATENT DOCUMENTS

| | | |
|---|---|---|
| EP | 2680522 A1 | 1/2014 |
| JP | 2017063405 A | 3/2017 |
| WO | 2006092852 A1 | 9/2006 |
| WO | 2011121690 A1 | 10/2011 |
| WO | 2016137201 A1 | 9/2016 |
| WO | 2016186738 A1 | 11/2016 |

OTHER PUBLICATIONS

Eunsung Park (LG Electronics) et al. Further Investigation on WUR Performance, IEEE802.11-16-1144r0, Sep. 2016, total 13 pages.
Ningwei et al., Packet Design for Wake-Up Receiver (WUR), IEEE802.11-17/0066r0, Jan. 10, 2017, 10 pages, XP68112488.
J. Oller et a., IEEE 802.11—enabled wake-up radio system:design and performance evaluation. Electronics Letters (vol. 50, Issue: 20, Sep. 25, 2014), 2 pages.
Steve Shellhammer, Qualcomm, WUR Modulation and Coding, IEEE 802.11-17/0366r1 TGba, Mar. 2017, Vancouver, BC, Canada.
Junghoon Suh, Huawei Technologies, Waveform Generation for Waveform Coding, IEEE 802.11-17/0376r0 TGba, Mar. 2017, Vancouver, BC, Canada.

\* cited by examiner

MULTIBAND SCHEDULING FOR WAKE UP RADIO

RELATED APPLICATIONS

The present application is a continuation of U.S. patent application Ser. No. 15/928,953 filed Mar. 22, 2018, now U.S. Pat. No. 10,531,454, issued Jan. 7, 2020, which is incorporated herein by reference, and claims the benefit of and priority to U.S. Patent Appl. No. 62/486,607, filed Apr. 18, 2017, "MULTIBAND SCHEDULING FOR WAKE UP RADIO", which is incorporated herein by reference.

FIELD

The present application relates to methods and systems for communicating with multiple Wake Up Radio devices.

BACKGROUND

In wireless communication, efficient use of the available power is one of the main goals of system design. Often, a wireless local area network (WLAN) device, such as in Internet of Things (IoT) applications, relies on a limited power supply (e.g., as supplied by rechargeable or non-rechargeable batteries). Examples of such a device may include sensor devices located in remote fields measuring some physical phenomenon, e.g., water level or temperature or location; and wearable devices measuring some bodily function, e.g., pulse rate.

Such a device may be designed to operate on a low duty cycle (e.g., communicating with an access point (AP) only once per day) and thus it may not be appropriate for its WLAN receiver circuit to be always on. The limited power supply (e.g., battery) of the device may be quickly exhausted if not provided with an appropriate sleep mode for the WLAN receiver circuit and an appropriate wake-up mechanism. The wake-up mechanism may require communication of wake-up signals between an AP and a device. In some applications, it may be desirable to enable an AP to communicate wake-up signals with multiple devices simultaneously in a spectrum efficient manner.

SUMMARY

According to a first aspect is a method of providing a wake-up signal in a communications channel for a plurality of receiving stations, including generating at least a first series and a second series of waveform coded symbols, the first series being incorporated into a first wake-up-radio (WUR) frame that is intended for a first receiving station and has a first predefined bandwidth, the second series being incorporated into a second WUR frame that is intended for a second receiving station and has a second predefined bandwidth. The first and second WUR frames are combined into a multiband WUR data unit having a bandwidth that is greater than a sum of the predefined bandwidths of the first and second WUR frames, and a wake-up signal, including the multiband WUR data unit, is transmitted in the communications channel.

In some example embodiments, combining the first and second WUR frames into the multiband WUR data unit is performed in a synchronized sample-by-sample manner using a sampling rate that is the same as a sampling rate used for the waveform coded symbols of the first and second WUR frames.

In some example embodiments, the first WUR frame and the second WUR frame each have a bandwidth of 5 MHz or less, wherein a frequency guard band is included between adjacent WUR frames.

In some example embodiments, each waveform coded symbol in the first series is generated from applying waveform coding in time domain to a first orthogonal frequency division multiplexing (OFDM) waveform for which all subcarriers outside of the first predefined bandwidth have been set to zero, and each waveform coded symbol in the second series is generated from applying waveform coding in time domain to a second OFDM waveform for which all subcarriers outside of the second predefined bandwidth have been set to zero, the method further comprising upconverting the multiband WUR data unit to provide the wake-up signal.

In some example embodiments, the first and second OFDM waveforms are each generated from a 64 point IFFT and have a subcarrier spacing of 312.5 KHz, the first OFDM waveform includes 14 subcarriers within the first predefined bandwidth of which one subcarrier is set to zero and thirteen subcarriers have a non-zero value, and the second OFDM waveform includes 14 subcarriers within the second predefined bandwidth of which one subcarrier is set to zero and thirteen subcarriers have a non-zero value.

In some examples, the thirteen non-zero subcarriers of each of the first and second OFDM waveforms, eight subcarriers are set to positive 1 and five subcarriers are set to negative 1.

In some examples, each of the waveform coded symbols represents a respective data bit and comprises a guard interval followed by first and second sub-symbols of equal duration, the corresponding data bit being represented by a different relative energy distribution between the first and second sub-symbols.

In some examples, the data bits are coded using on-off keying to represent data "1" and data "0" bits, wherein a data "1" bit is represented by a waveform coded symbol with the first sub-symbol having higher energy than the second sub-symbol, and a data "0" bit is represented by a waveform coded symbol with the first sub-symbol having lower energy than the second sub-symbol.

In some examples, the data bits are coded using on-off keying to represent data "1" and data "0" bits, wherein a data "0" bit is represented by a waveform coded symbol with the first sub-symbol having higher energy than the second sub-symbol, and a data "1" bit is represented by a waveform coded symbol with the first sub-symbol having lower energy than the second sub-symbol.

In some examples, the guard interval of each waveform coded symbol has substantially zero energy, and in some examples the multiband WUR data unit is appended to a legacy preamble symbol.

In some example embodiments the method includes generating at least a third series and a fourth series of waveform coded symbols, the third series being incorporated into a third wake-up-radio (WUR) frame that is intended for a first receiving station and has a third predefined bandwidth, the fourth series being incorporated into a fourth WUR frame that is intended for a fourth receiving station and has a second predefined bandwidth. The third and fourth WUR frames are combined with the first and second WUR frames into the multiband WUR data unit included in the wake-up signal.

According to a second aspect is a transmitter for transmitting a wake-up signal in a communications channel. The transmitter includes a waveform coding module configured to generate a multiband wake-up-radio (WUR) data unit including a first WUR frame that incorporates a first series of waveform coded symbols and occupies a first predefined bandwidth within a bandwidth of the multiband WUR data unit, and a second WUR frame that incorporates a second series of waveform coded symbols and occupies a second defined bandwidth within the bandwidth of the multiband WUR data unit, the bandwidth of the WUR data unit being greater than a sum of the predefined bandwidths of the first and second WUR frames. The transmitter also includes a modulator for up-converting the multiband WUR data unit onto a carrier frequency and transmitting a wake-up signal including the multiband WUR data unit in the communications channel.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DETAILED DESCRIPTION

A user device or station such as a machine type communication device or sensor device that is intended to operate in a wireless network such as a wireless local area network (WLAN) may have a separate low-power Wake Up Radio (WUR) circuit in addition to a higher power WLAN transceiver circuit. A WUR circuit is generally a low-power receiver circuit designed for receiving and detecting a wake-up signal, and may in some examples be a simplified version of the main WLAN transceiver circuit and may be implemented on an integrated circuit (IC) or chip. The WUR circuit communicates with the WLAN transceiver circuit, or other equivalent circuit, of the device, so the WLAN transceiver circuit may sleep and conserve power until the WUR circuit wakes up the WLAN transceiver circuit. The WUR circuit wakes up the WLAN transceiver circuit, or other equivalent circuit, when the WUR circuit detects a wake-up signal from an access point AP (typically, an AP associated with the WLAN device).

Figure 1:
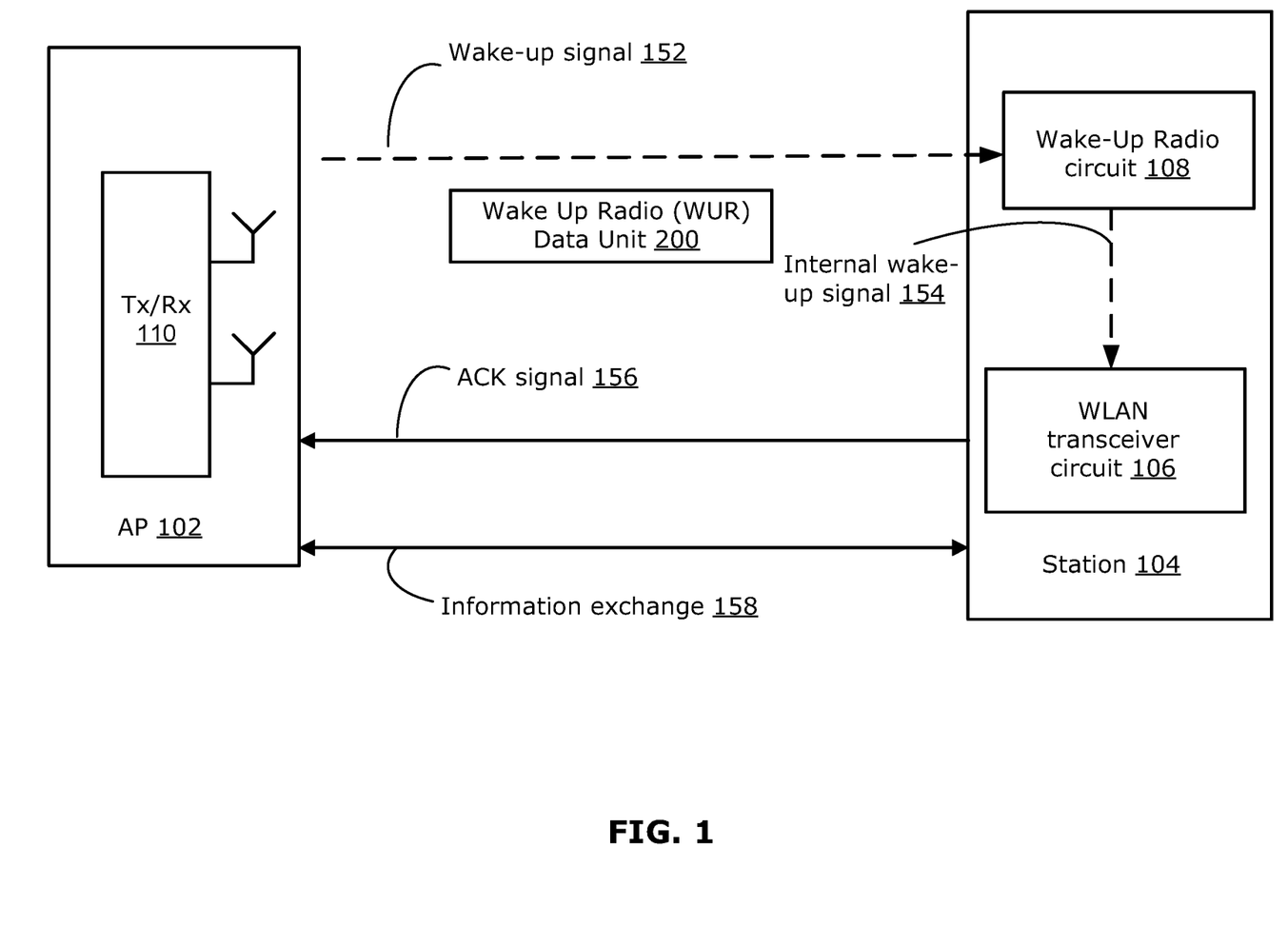
FIG. 1 is a block diagram illustrating communications between an AP and an example station having a Wake Up Radio circuit.

In this regard, FIG. 1 is a schematic diagram illustrating an example AP 102 and an example station 104 associated with the AP 102. In example embodiments the station 104 is a low duty cycle WLAN device or other wireless device. The example station 104 includes a WLAN transceiver circuit 106 (e.g., a Wi-Fi transceiver) and a WUR circuit 108. The AP 102 includes WLAN transceiver circuit 110. In example embodiments, the WUR circuit 108 is a simple low power receiver that does not have a transmitter and functions to wake up the WLAN transceiver circuit 106 when needed.

FIG. 1 illustrates a set of example signals that may be communicated for waking up a sleeping WLAN transceiver circuit 106. The AP 102 may send a wake-up signal 152, carrying a Wake-Up-Radio (WUR) data unit 200 (described further below) to the station 104. The WUR data unit 200 is detected by the WUR circuit 108, and the WUR circuit 108 sends an internal wake-up signal 154 to the WLAN receiver circuit 106, waking up the WLAN transceiver circuit 106 if the WLAN receiver circuit 106 is in sleep mode. The WLAN transceiver circuit 106 then sends an ACK signal 156 back to the AP 102. Appropriate information exchange 158 between the AP 102 and the station 104 (via the WLAN transceiver circuit 106) may then take place. After the information exchange 158 is finished, the WLAN transceiver circuit 106 may return to the sleep state.

Although FIG. 1 shows wakeup signal 152 being communicated to a WUR circuit 108 that is associated with a WLAN transceiver circuit 106, the processes and systems described in the present disclosure may be applicable to other circuits, including other wireless receiver circuits, which may benefit from a wake-up mechanism.

Figure 2:
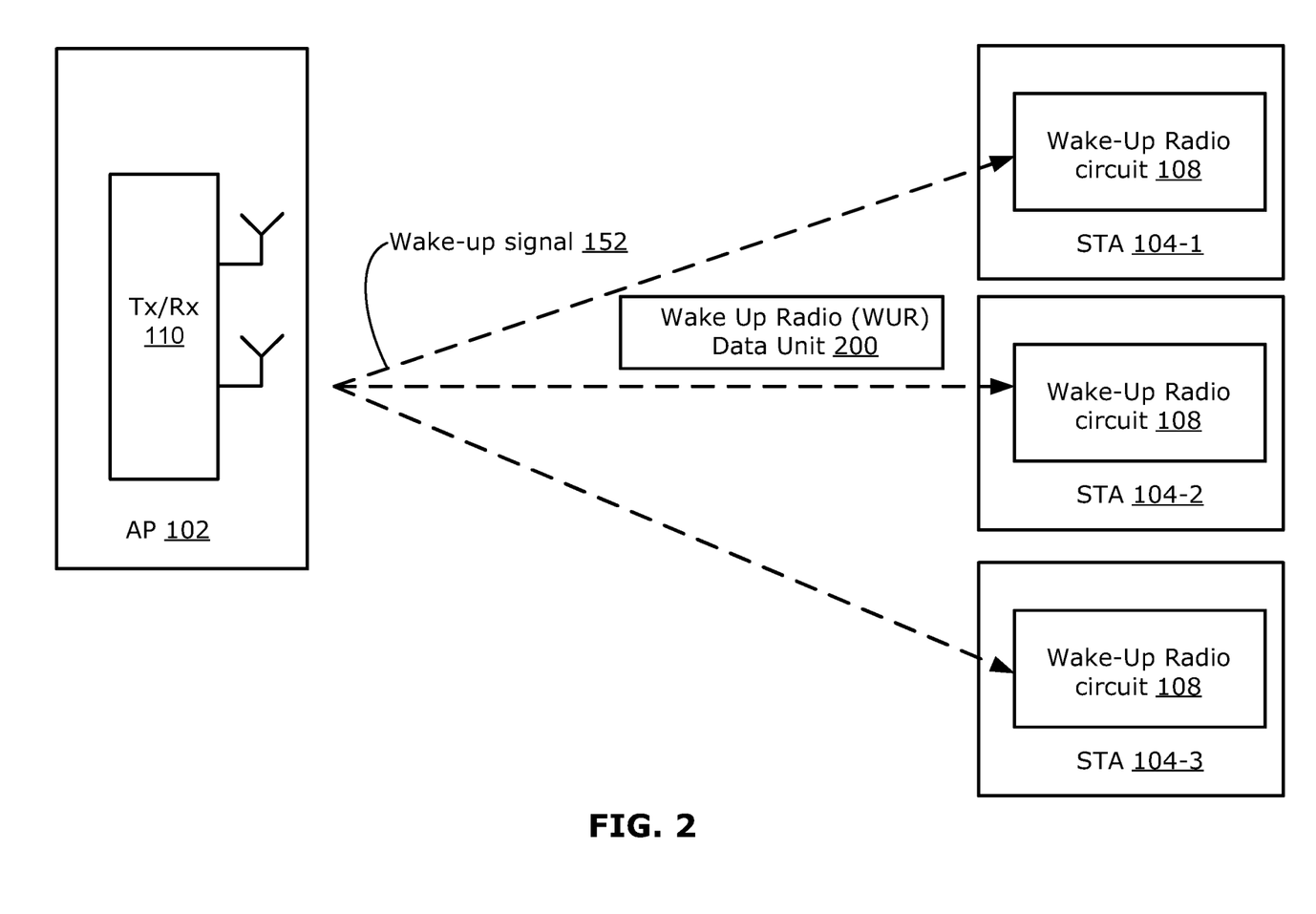
FIG. 2 is a block diagram illustrating communications between an AP and multiple stations having respective Wake Up Radio circuits.

In some applications, including for example IoT applications, dense populations of stations 104 may be serviced by small numbers of APs 102 and thus example embodiments are described herein which facilitate multiband communications for WUR signals that allow a single AP 102 to send unique WUR frames using the same data unit 200 to multiple stations 104. In this regard, FIG. 2 shows a wakeup signal 152 that includes multiband WUR data unit 200 being communicated simultaneously to three stations 104-1, 104-2, 104-3 that each include a respective WUR circuit 108.

Figure 3:
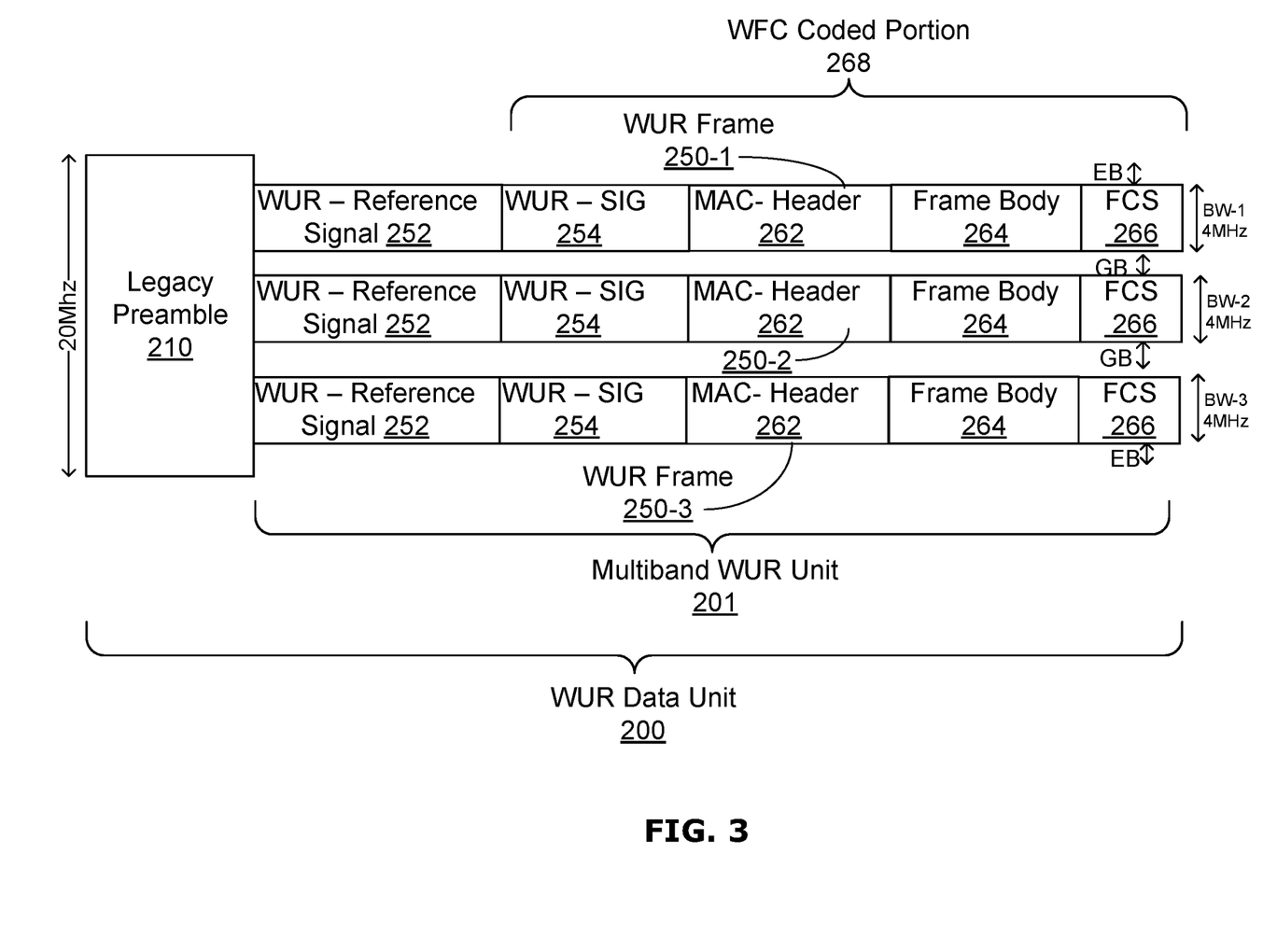
FIG. 3 illustrates a multiband frame format for an example wake-up radio data unit.

An example frame format for a multiband WUR data unit 200 is shown in FIG. 3. The heights of the various blocks shown in FIG. 3 illustrate the relative bandwidths (BWs) of each portion. In the example of FIG. 3, the WUR data unit 200 includes a legacy preamble 210 pre-pended to a multiband WUR unit 201. Legacy preamble 210 is included to silence legacy devices within the network and may be omitted in some examples where legacy equipment is not anticipated to operate. In applications where legacy preamble 210 is omitted, WUR Data Unit 200 will be identical to multiband WUR unit 201. Multiband WUR unit 201 includes three concurrent WUR frames 250-1, 250-2 and 250-3 (also referred to generically as WUR frame 250), each of which can include unique information for a respective one of the stations 104-1, 104-2 and 104-3. In example embodiments, legacy preamble 210 occupies a channel bandwidth (CH BW) of 20 MHz, and each of the WUR frames 250-1, 250-2 and 250-3 occupy a respective unique 4.1 MHz sub-band BW-1, BW-2 and BW-3 of the channel bandwidth CH BW. In the illustrated embodiment, adjacent WUR Frames 250-1 and 250-2 are separated in frequency by a guard band GB and adjacent WUR Frames 250-2 and 250-3 are also separated in frequency by further guard band GB. Furthermore, in the illustrated embodiment, an edge band EB is provided at the outer frequency boundary of WUR frame 250-1 and a similar edge band EB is provided at the outer frequency boundary of WUR frame 250-3.

As will be explained in greater detail below, in example embodiments the Multiband WUR Unit 201 is derived from a conventional 802.11 Orthogonal Frequency Division Multiplexing (OFDM) symbol having the numerology parameters: Number of subcarriers (tones)=64; useful symbol duration $T_u$=3.2 μs; subcarrier spacing SS=312.5 KHz; and Bandwidth=20 MHz. In example embodiments, fourteen (14) subcarriers are allocated for each of the WUR Frames 250-1, 250-2, 250-3, seven (7) subcarriers are allocated for each guard band GB and four (4) subcarriers are allocated for each edge band EB such that the allocation of the 64 subcarriers can be represented as in the following table:

TABLE 1

Allocation of 64 subcarriers in multiband WUR Unit 201:

| Subcarrier Nos. | Allocated To | Band Width |
|---|---|---|
| $S_{28}$ to $S_{31}$ (4 tones) | EB | 1406.25 KHz |
| $S_{14}$ to $S_{27}$ (14 tones) | WUR Frame 250-1 (BW-1) | 4062.5 KHz |
| $S_7$ to $S_{13}$ (7 tones) | GB | 2500 KHz |
| $S_{-7}$ to $S_6$ (14 tones) | WUR Frame 250-2 (BW-2) | 4062.5 KHz |
| $S_{-14}$ to $S_{-8}$ (7 tones) | GB | 2500 KHz |
| $S_{-15}$ to $S_{-28}$ (14 tones) | WUR Frame 250-3 (BW-3) | 4062.5 KHz |
| $S_{-32}$ to $S_{-29}$ (4 tones) | EB | 1406.26 KHz |

Each WUR frame 250-1, 205-2, 250-3 includes information that can be specific for the respective stations 104-1, 104-2 and 104-3, and each WUR frame 250-1, 250-2 and 250-3 can include the following fields: WUR—Reference Signal field 252; WUR signal (SIG) field 254; MAC header 262; frame body 264; and frame check sequence (FCS) 266. In an example embodiment WUR—Reference Signal field 252 may include a wakeup signal preamble, for example a pseudo noise (PN) sequence. The WUR signal (SIG) field 254 may include a control signal. The MAC header 262 may include a receiver address. The MAC header 262, frame body 264 and FCS 266 may together be referred to as the payload of the WUR frame 250. In some examples, WUR frames 250-1, 250-2 and 250-3 may omit one or more of the frame fields identified in FIG. 3, and/or may include additional fields.

The WUR-Reference Signal 252 is provided for packet detection and synchronization. In some examples, WUR-Reference signal 252 may include a short training field (STF) that can be used by the WUR circuit 108 in the respective station 104-1, 104-2, 104-3 to detect the WUR frame 250 as distinct from other frames and allow the WUR circuit 108 to synchronize to the WUR frame 250. In some examples, WUR-Reference Signal 252 may include a sequence that can be correlated at the WUR circuit 108 to facilitate frame synchronization.

In example embodiments, the WUR circuit 108 of each of the stations 104-1, 104-2 and 104-3 is implemented as a simple low power consuming receiver circuit, and accordingly WUR frame 250 is designed to enable efficient and accurate decoding at a low power WUR circuit 108. In this regard, time-domain waveform coding (WFC) is used for parts of the WUR Frame 250 that follow the WUR Reference Signal 252, shown in FIG. 3 as WFC Coded Portion 268. In example embodiments filtering is applied at the WUR circuits 108 of respective stations 104-1, 104-2 and 104-3 to separate the respective WUR Frames 205-1, 250-2 and 205-3 from the multiband WUR Unit 201. Typically, increasing the filter coefficient (e.g. number of taps) at a filter increases the accuracy of the filtering which is beneficial in a multiband environment, however it also increases cost and complexity of the filter. Furthermore, simulations have indicated that in some examples of a WFC signal, the greater the number of taps used in a filter at the WUR circuit 108 the greater the chance of inter-symbol interference occurring is. Accordingly, example embodiments are described herein that may in some applications provide a multiband waveform coded WUR Frame format that can be decoded at WUR receivers using filters with a filter coefficient that optimizes the trade-offs between inter-symbol interference (ISI), power consumption and adjacent band interference.

Figure 4:
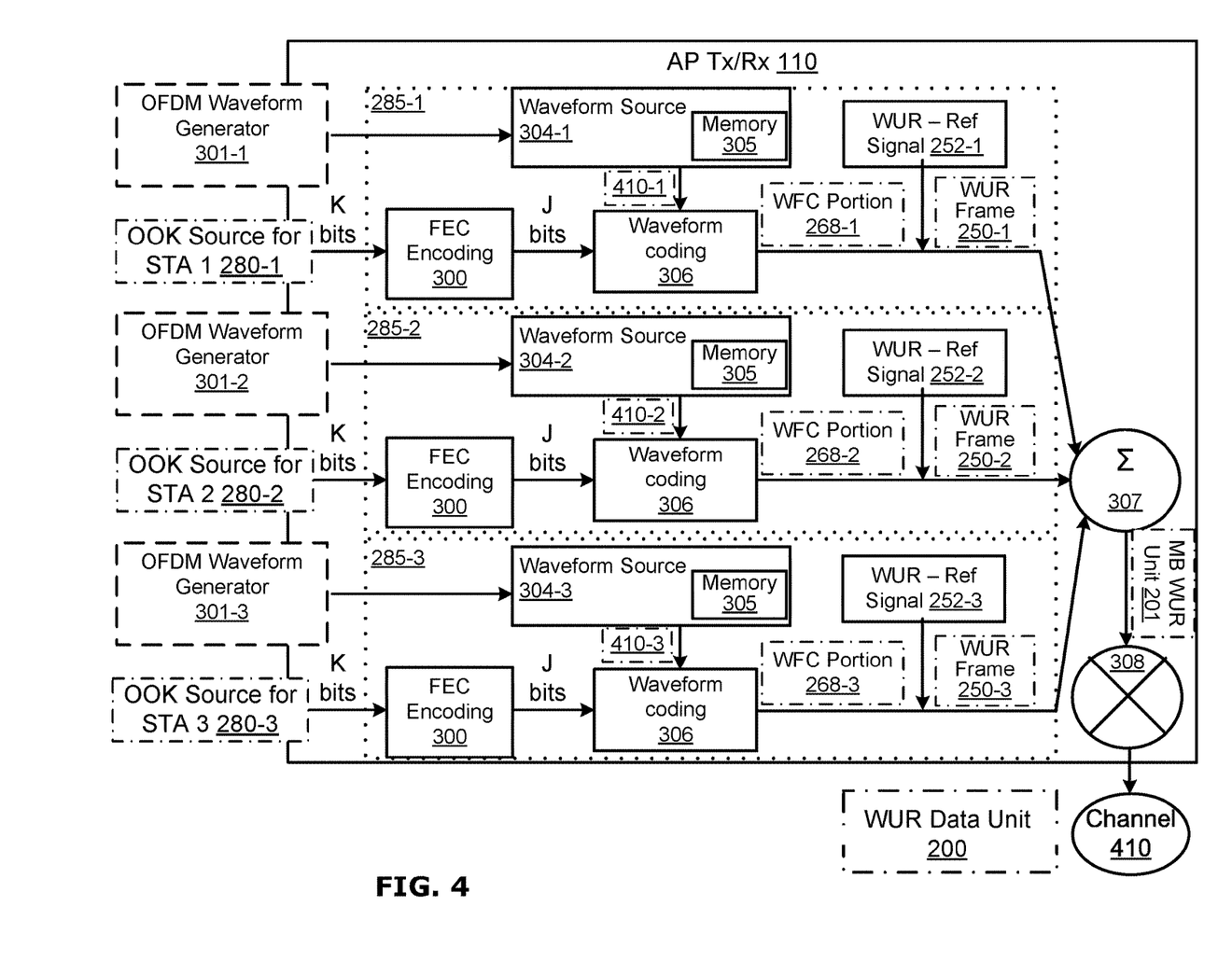
FIG. 4 is a block diagram illustrating a multiband wake-up frame encoding system according to an example embodiment.

FIG. 4 is a basic system block diagram illustrating a WUR system that employs waveform coding. FIG. 4 shows the process flow applied at the AP transceiver 110 to generate multiband WUR unit 201 with the format shown in Table 1 above. Each of the processing blocks 300, 304-1, 304-2, 304-3, 306, 307 and 308 shown as being performed at AP transceiver 110 represents an operation that may for example be implemented as a module or element as part of one or more integrated circuits.

In the example of FIG. 4, unique source data is provided for each of the stations 104-1, 104-2 and 104-3 in the form of binary on-off keying (OOK) mapped source data 280-1, 280-2, and 280-3 respectively. In example embodiments, the source data 280-1, 280-2, and 280-3 includes bits for encoding and inclusion in the WFC coded portions 268 of the WUR Frames 250-1, 250-2 and 250-3, respectively. The AP transceiver 110 implements parallel processing paths 285-1, 285-2 and 285-3 for the respective source data 280-1, 280-2, and 280-3.

The operation of first processing path 285-1 as it processes and encodes OOK mapped source data 280-1 and outputs corresponding WUR Frame 250-1 will now be described in greater detail. In some examples, source data 280-1 is segmented into groups of K bits for processing. Forward error correction (FEC) encoding to apply error correction and/or compress data (e.g. encoding K bits to J bit codewords) can be applied to the binary data by an FEC encoding operation 300, however such encoding may be omitted in some embodiments.

Figure 5A:
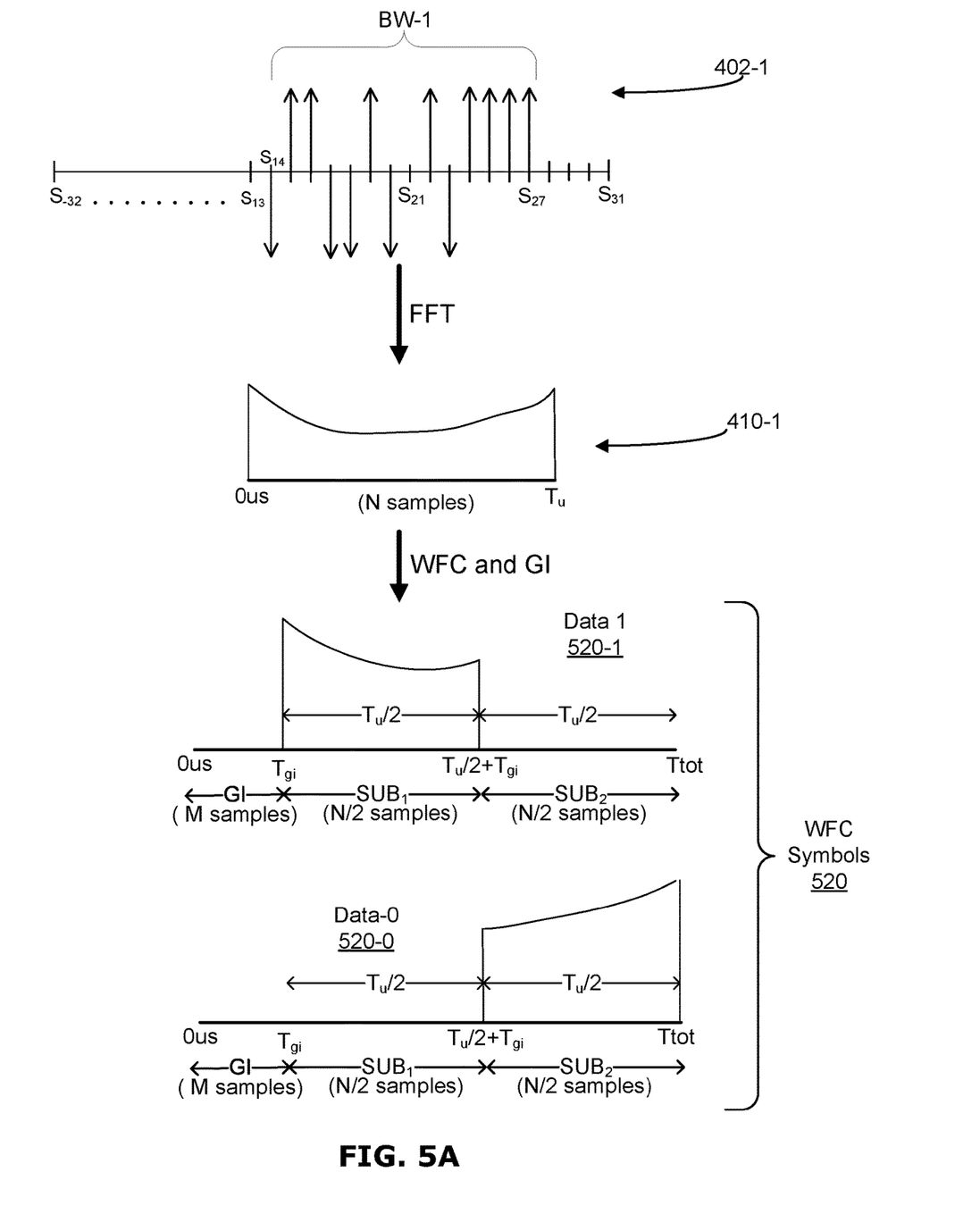
FIG. 5A shows frequency domain and time domain representations of an example first sub-band waveform used in the system of FIG. 4.

The processing path 285-1 includes a waveform source 304-1 that provides symbol waveforms 410-1 to a waveform coding operation 306. Symbol waveform 410-1 has a predefined energy configuration within a predefined bandwidth (BW) and a predefined symbol duration ($T_u$) that includes a predefined number of samples (N). As will now be described, in example embodiments symbol waveform 410-1 is a multi-carrier waveform derived from subcarriers $S_{14}$ to $S_{27}$ generated from a 64 point IFFT. In the presently described example, waveform source 304-1 includes memory 305 that stores a previously generated time domain version of an Orthogonal Frequency Division Multiplexing (OFDM) waveform such as the example time domain symbol waveform 410-1 that is shown in FIG. 5A. In particular, in an example embodiment an OFDM waveform generator 301-1 that includes a 64 point inverse fast Fourier transform (IFFT) operation is used to generate a frequency domain OFDM symbol 402-1 in which the sub-set of allocated subcarriers $S_{14}$ to $S_{27}$ that occupy the bandwidth BW-1 are used to provide symbol waveform 410-1.

In the illustrated example symbol 402-1 of FIG. 5A, the central subcarrier $S_{21}$ in the group of 14 subcarriers $S_{14}$ to $S_{27}$ is a Null, and the remaining 13 subcarriers in the group are assigned values as follows: Subcarriers $S_{15}$, $S_{16}$, $S_{19}$, $S_{22}$, $S_{24}$, $S_{25}$, $S_{26}$, and $S_{27}$ are set to plus one (+1); and subcarriers $S_{14}$, $S_{17}$, $S_{18}$, $S_{20}$, and $S_{22}$ are each set to negative one (−1). The remaining subcarriers $S_{-32}$ to $S_{-13}$ and $S_{28}$ to $S_{31}$ are each set to 0. In the illustrated example, the symbol 402-1 is derived from a conventional 802.11 OFDM symbol having the numerology parameters noted above in respect of Table 1: Number of subcarriers=64, with number of used subcarriers $SC_U$=14 (including subcarriers $S_{14}$ to $S_{27}$, with $S_{21}$ used for a null); useful symbol duration $T_u$=3.2 μs; and subcarrier spacing SS=312.5 KHz. The bandwidth BW-1 of symbol 402-1 is 13×312.5 Khz≈4.1 MHz. Waveform 410-1 in FIG. 5A represents a time domain version of OFDM symbol 402-1. In example embodiments, OFDM time domain waveform 410-1 is generated using the standard 802.11 sampling rate of 20 MHz, such that OFDM waveform 410-1 includes N=64 samples.

As noted above, in example embodiments the operations performed by OFDM symbol generator 301-1 to provide symbol waveform 410-1 are done at a configuration time prior to WUR frame 250-1 processing and transmission, with waveform source 304-1 then providing successive copies of the pre-stored symbol waveform 410-1 at the time of WUR frame 250-1 generation by AP Tx/Rx 110, thus eliminating the requirement for an IFFT operation for each symbol waveform used for WUR frame 250-1. In at least some example embodiments, OFDM waveform generator 301-1 is configurable and can be used to generate symbol waveforms that have different numerology parameters than those stated above, such that the stored waveform can be changed if required.

In the example of FIG. 4, a waveform coding operation 306 is used to code the J data bits encoded from OOK source data 280-1 onto J successive time-domain symbol waveforms 410-1. In an example embodiment, the waveform coding that is applied at operation 306 is Manchester coding, which is also known as phase encoding (PE). In particular, Manchester coding is a line code in which the encoding of each data bit is either low then high, or high then low, of equal time. Accordingly, at waveform coding operation 306, waveform 410-1 is effectively divided into two sub-symbols of equal duration ($T_u$/2) with each "0" bit is encoded as a set of two sub-symbols and, each "1" bit is encoded as set of two sub-symbols. In an example embodiment, the encoding is as shown in Table 2 below:

TABLE 2

Manchester encoding of OOK data bits:

| OOK Data Bit | First sub-symbol $SUB_1$ | Second sub-symbol $SUB_2$ |
|---|---|---|
| "1" | 1 (ON) | 0 (OFF) |
| "0" | 0 (OFF) | 1 (ON) |

It will be appreciated that the sub-symbol order described herein can be reversed for data bits 0 and 1 in alternative configurations.

In example embodiments, an "OFF" sub-symbol includes substantially blank or zero energy, and an "ON" sub-symbol includes a higher energy level than the "OFF" sub-symbol. In example embodiments, the "ON" sub-symbol energy matches the energy of a corresponding duration of the symbol waveform 410-1 having the same duration as the "ON" sub-symbol. Waveform coding operation 306 applies the PE coding to the symbol waveform 410-1 in the time domain, and in this regard, FIG. 5A graphically illustrates, in time domain the coding that is applied to OFDM symbol waveform 410-1 to generate a data "1" WFC symbol 520-1 and a data "0" WFC symbol 520-0 (referred to generically as WFC symbol 520).

In an example embodiment, a guard interval (GI) is prepended to each WFC symbol 510 as part of waveform coding operation 306. In one example, the GI has a duration $T_{gi}$=0.8 μs (e.g. ¼ of useful symbol duration $T_u$) such that each WFC symbol 520 has a duration $T_{tot}=T_u+T_{GI}$=4 μs. In example embodiments, guard interval GI is created by prepending zero energy samples such that the WFC symbols 520 have no or negligible amplitude for the duration $T_{gi}$, which may boost the transmitter energy for the portions of the symbol that are included in the useful symbol duration $T_u$. In particular, transmitter energy per symbol is fixed to a set amount that is determined either by power spectral density regulation or a power amplifier of the transmitter, and accordingly the less energy used for the GI the more energy can be used for the non-zero "ON" sub-symbol portion.

In some example embodiments the standard 802.11 sampling rate of 20 MHz is applied by waveform coding operation 306 when generating the data symbols 520. Accordingly, in the case of a Data "1", the waveform coded output symbol 520-1 has a duration of $T_{tot}$=4 μs and L=80 samples and includes, in the following order: a guard interval of duration $T_{gi}$=0.8 μs that includes M=16 samples that correspond to GI samples of waveform 350; a first sub-symbol $SUB_1$ of duration $T_u$/2=1.6 μs that includes N/2=32 samples copied from the portion of symbol waveform 350 that follows the GI portion; and a second sub-symbol $SUB_2$ of duration $T_u$/2=1.6 μs that includes N/2=32 samples in which the subcarrier energy has been forced to "0". In the example shown in FIG. 5A, the symbol 520-1 has negligible or zero energy except during the duration between $T_{gi}$ and $T_u/2+T_{gi}$ (namely 0.8 μs to 2.4 μs)

In the case of data "0" output symbol 520-0, the GI portion remains the same and the order of sub symbols $SUB_1$ and $SUB_2$ is reversed such that in the case of a Data "0", the waveform coded output symbol 520-0 has a duration of $T_{tot}$=4 μs and L=80 samples and includes, in the following order: a guard interval of duration $T_{gi}$=0.8 μs that includes M=16 samples that correspond to GI samples of waveform 350; a first sub-symbol $SUB_1$ of duration $T_u$/2=1.6 μs that includes N/2=32 samples in which the subcarrier energy has been forced to "0"; and a second sub-symbol $SUB_2$ of duration $T_u$/2=1.6 μs that includes N/2=32 samples copied from final 32 samples of symbol waveform 350. In the example shown in FIG. 5A, the symbol 520-1 has negligible or zero energy except during the duration between $T_u/2+T_{gi}$ to $T_{tot}$ (namely 2.4 μs to 4 μs).

Accordingly, in example embodiments each of the J data bits from OOK source data 280-1 is represented at the output of waveform coding operation 306 as a respective WFC symbol 520. Each WFC symbol 520 has a defined total symbol duration $T_{tot}$ that corresponds to L samples. Each WFC symbol 520 includes two components, namely: a leading GI that has a leading guard interval duration $T_{gi}$ that corresponds to M samples; and a useful symbol component immediately following the GI and having a useful symbol duration $T_u$ that corresponds to N samples. The useful symbol of duration $T_u$ is divided into two sub-symbols $SUB_1$ and $SUB_2$ that each have equal length durations $T_u$/2 corresponding to N/2 samples. Binary bit information is represented by the two sub-symbols $SUB_1$ and $SUB_2$ being either low then high, or high then low. The actual signal value contained in the GI is immaterial, however, as noted above, using a low or zero energy signal can boost transmitter energy in non-zero regions of the symbol. In example embodiments the WFC Symbol 520 is configured to fall within a defined BW with minimal leakage, facilitating the use of a low tap filter at WUR circuit 108 of Station 104-1.

It will be appreciated that WFC symbols 520 having the characteristics stated in the previous paragraph could be generated using methods, components and symbol numerology other than those described in respect of the system shown in FIG. 4. Furthermore, in some example embodiments copies of WFC symbols 520-0 and 520-1 can be pre-generated and stored in memory 305 at waveform source 304, with wave form coding operation 306 selecting the appropriate WFC symbol to output based on the OOK value of an OOK source data 280-1.

Accordingly, in example embodiments, each set of K OOK source data bits 280-1 is represented at the output of waveform coding operation 306 as a series of J WFC symbols 520 that form WFC portion 268-1. WUR-REF Signal 252-1 is then prepended to the WFC portion 268-1 to complete WUR Frame 250-1.

Figure 5B:
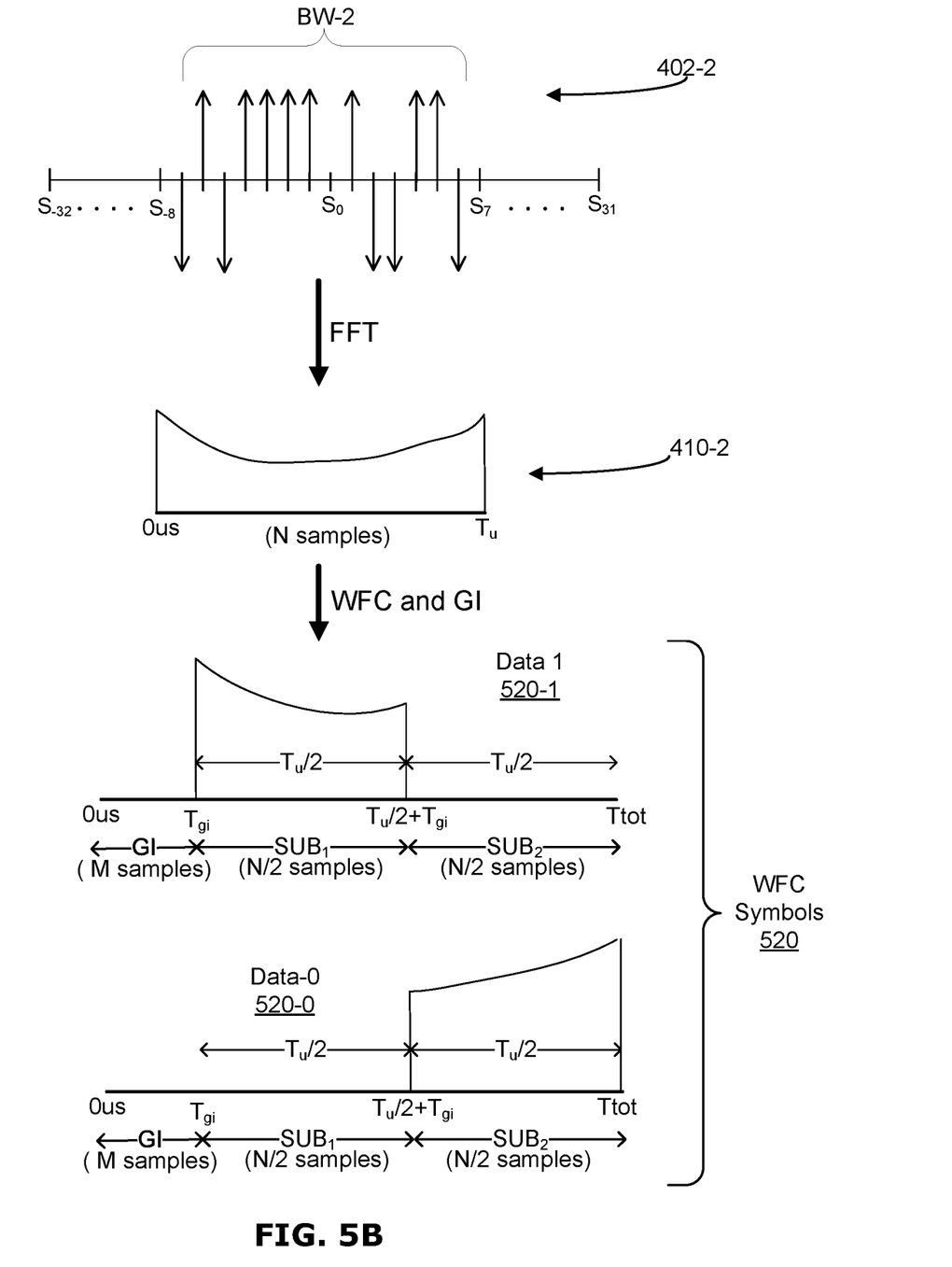
FIG. 5B shows frequency domain and time domain representations of an example second sub-band waveform used in the system of FIG. 4.

Processing path 285-2 processes and encodes OOK mapped source data 280-2 to output corresponding WUR Frame 250-2 in a manner identical to that described above in respect of processing path 285-1 except that the waveform source 304-2 uses a different set of OFDM subcarriers for frequency domain waveform 402-2 and time domain waveform 410-2 as illustrated in FIG. 5B. In particular, OFDM waveform generator 301-2 applies a 64 point inverse fast Fourier transform (IFFT) operation to generate a frequency domain OFDM symbol 402-2 in which the sub-set of allocated subcarriers $S_{-7}$ to $S_6$ that occupy the bandwidth BW-2 are used to provide symbol waveform 410-2. In the illustrated example symbol 402-2 of FIG. 5B, the central subcarrier $S_0$ in the group of 14 subcarriers $S_{-7}$ to $S_6$ is a DC Null, and the remaining 13 subcarriers in the group are assigned values as follows: Subcarriers $S_{-6}$, $S_{-4}$, $S_{-3}$, $S_{-2}$, $S_{-1}$, $S_1$, $S_4$, and $S_5$ are set to plus one (+1); and subcarriers $S_{-7}$, $S_{-5}$, $S_2$, $S_3$, and $S_6$ are each set to negative one (−1). The remaining subcarriers $S_{-32}$ to $S_{-8}$ and $S_7$ to $S_{31}$ are each set to 0. The bandwidth BW-2 of symbol 402-2 is 13×312.5 Khz≈4.1 MHz. Waveform 410-2 in FIG. 5B represents a time domain version of OFDM symbol 402-2.

Figure 5C:
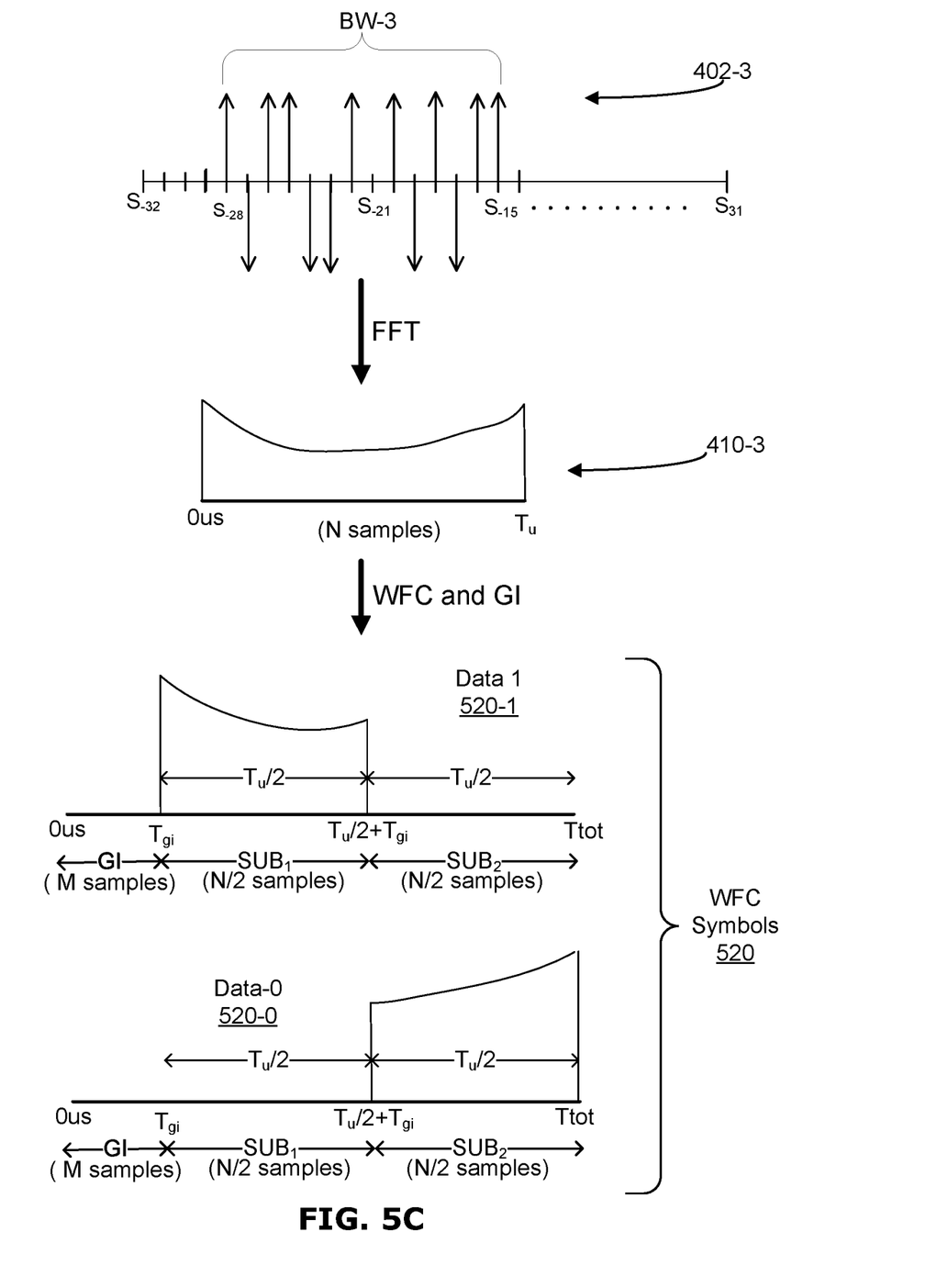
FIG. 5C shows frequency domain and time domain representations of an example third sub-band waveform used in the system of FIG. 4.

Processing path 285-3 processes and encodes OOK mapped source data 280-3 to output corresponding WUR Frame 250-3 in a manner identical to that described above in respect of processing paths 285-1 and 285-2 except that the waveform source 304-3 uses a different set of OFDM subcarriers for frequency domain waveform 402-3 and time domain waveform 410-3 as illustrated in FIG. 5C. In particular, OFDM waveform generator 301-3 applies a 64 point inverse fast Fourier transform (IFFT) operation to generate an frequency domain OFDM symbol 402-3 in which the sub-set of allocated subcarriers $S_{-28}$ to $S_{-15}$ that occupy the bandwidth BW-3 are used to provide symbol waveform 410-3. In the illustrated example symbol 402-3 of FIG. 5C, the central subcarrier $S_{-21}$ in the group of 14 subcarriers $S_{-28}$ to $S_{-15}$ is a Null, and the remaining 13 subcarriers in the group are assigned values as follows: Subcarriers $S_{-28}$, $S_{-26}$, $S_{-25}$, $S_{-22}$, $S_{-29}$, $S_{-18}$, $S_{-16}$, and $S_{-15}$ are set to plus one (+1); and subcarriers $S_{-27}$, $S_{-24}$, $S_{-23}$, $S_{-19}$, and $S_{-17}$ are each set to negative one (−1). The remaining subcarriers $S_{-32}$ to $S_{-29}$ and $S_{-14}$ to $S_{31}$ are each set to 0. The bandwidth BW-3 of symbol 402-3 is 13×312.5 Khz≈4.1 MHz. Waveform 410-3 in FIG. 5C represents a time domain version of OFDM symbol 402-3.

As noted above, the WFC symbols included in WUR frames 250-1, 250-2 and 250-3 are each derived from a respective group of sub-carriers from a 64 carrier OFDM symbol. In some examples, OFDM waveform generators 301-1, 301-2, 301-3 are implemented using different sub-carrier groups of the same 64-subcarrier OFDM waveform generator. In example embodiments, the tone patterns used within each of the OFDM symbols 402-1, 402-2 and 402-3 are based on the corresponding tones that are occupied in the conventional OFDM 802.11 Long Training Sequence (LTS) symbol (with the exception of OFDM symbol 402-3 where the +1 subcarrier $S_{-28}$ and −1 subcarrier $S_{-27}$ values have been added because the corresponding subcarriers $S_{-28}$ and $S_{-27}$ are null in the conventional LTS symbol). In the illustrated embodiment, each of the OFDM symbols 402-1, 402-2 and 402-3 includes eight (8) sub-carriers set to positive one (+1) and five (5) sub-carriers set to negative one (−1). However, in alternative embodiments different tone patterns could be employed.

Accordingly, the processing paths 285-1, 285-2 and 285-3 respectively output signals concurrently in three different frequency bands as follows: processing path 285-1 outputs WUR frame 250-1 in frequency band BW-1; processing path 285-2 outputs WUR frame 250-2 in frequency band BW-2; and processing path 285-3 outputs WUR frame 250-3 in frequency band BW-3. The three WUR frames 250-1, 250-2 and 250-3 are combined at adding circuit 307 in a synchronized sample-by-sample manner using the same sampling rate that was used in generating WFC symbols 520 to generate multiband WUR unit 201. Multiband WUR unit 201 has the characteristics described above in respect of FIG. 3 and Table 1. In examples where legacy preamble 210 is included, the legacy preamble 210 is prepended to multiband WUR unit 201 to form WUR data unit 200, which is then upconverted at modulator 308 to a channel carrier frequency and transmitted through wireless network channel 410 as part of wake-up signal 152. In example embodiments the same transmit filter used for 802.11 is used to provide spectral filtering to ensure that the transmitted symbols, including any edge tones, fall within a 20 MHz spectral mask.

Figure 6:
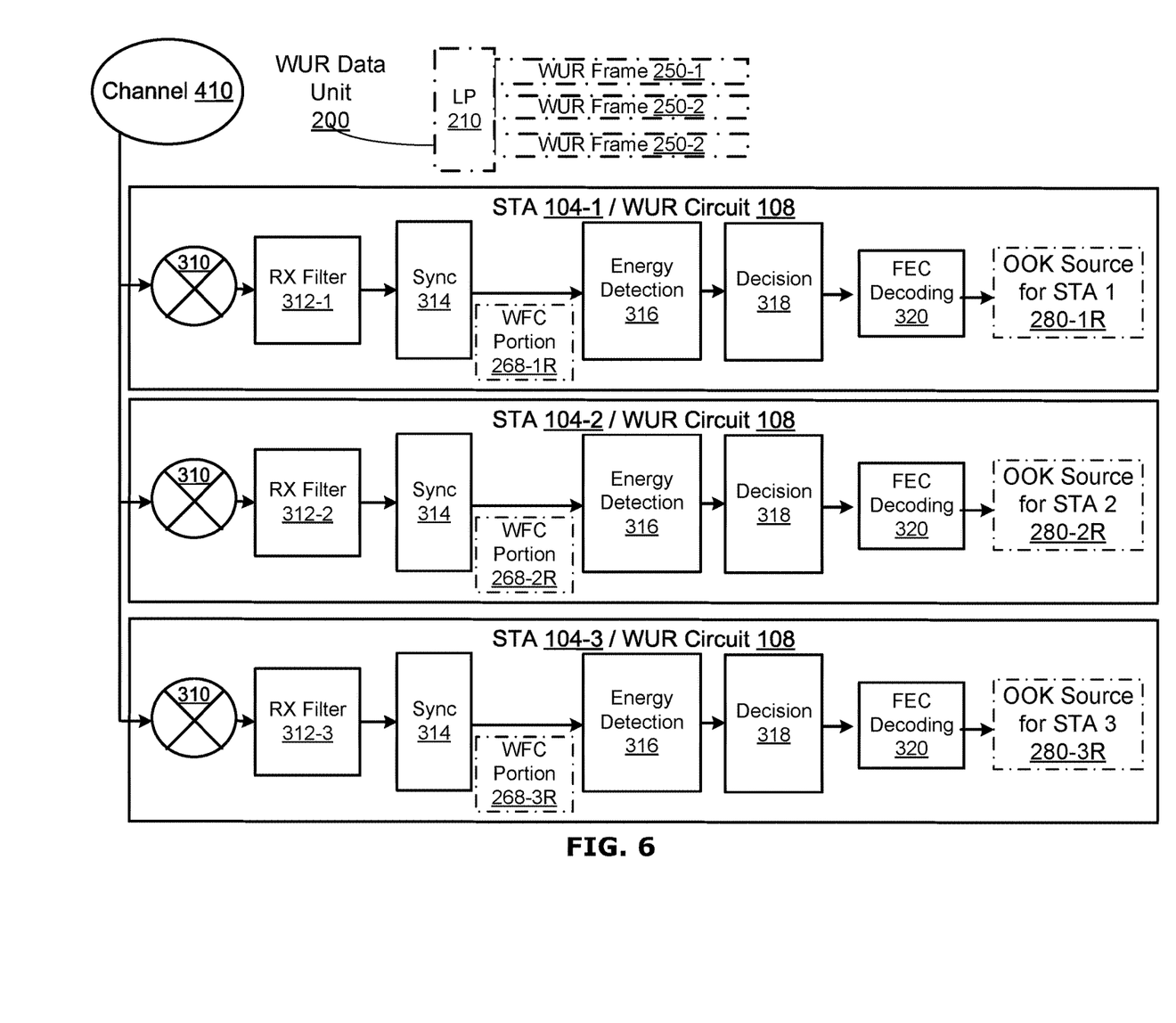
FIG. 6 is a block diagram illustrating a multiband wake-up frame decoding wake up receiver circuits.

FIG. 6 shows three target stations 104-1, 104-2 and 104-3 and the decoding operations performed at three respective WUR circuits 108 in respect of a WUR data unit 200 included in a wake-up signal 152 received through wireless channel 410. In some examples, each processing block 310, 312, 314, 316, 318 and 320 shown as being performed at WUR circuit 108 represents an operation that may be implemented as a module or element that is part of one or more integrated circuits. As shown in FIG. 6, each of the stations 104-1, 104-2 and 104-3 includes a respective filter 312-1, 312-2 and 312-3 (referred to generically as filter 312). In at least some examples, the receiving stations 104-1, 104-2 and 104-3 have been pre-configured or pre-informed during prior communications of the WUR Frame 250-1, 250-2, or 250-3 that has been allocated to it, enabling each station 104-1, 104-2, 104-3 to tune its respective filter 312-1, 312-2, 312-3 of its respective WUR circuit 108 to the bandwidth of its allocated WUR Frame 250-1, 250-2 or 205-3. Accordingly, in an example embodiment: station 104-1 configures its filter 312-1 as a band pass filter for BW-1, which corresponds to a 6.56 MHz center frequency with a 4 MHz bandwidth; station 104-2 configures its filter 312-2 as a low pass filter for BW-2, which corresponds to a OMHz center frequency with a 4 MHz bandwidth; and station 104-3 configures its filter 312-3 as a band pass filter for BW-3, which corresponds to a −6.56 MHz center frequency with a 4 MHz bandwidth. In some examples the filters 312 are 8 tap filters (filter coefficient=8) to optimize between inter-band interference rejection and ISI. In some examples the filters are 4 tap filters (filter coefficient=4) to optimize between inter-band interference rejection and ISI, but with a greater weighting to reduced power consumption.

The processing of a received WUR data unit 200 at the WUR circuit 108 of station 104-1 will now be described in greater detail according to an example embodiment. The received WUR data unit 200 is received as part of wake-up signal 152 at WUR circuit 108 and down converted at modulator 310 to baseband. The baseband WUR data unit 200 is then filtered at filter 312-1 to restrict the signal to the bandwidth BW-1 that corresponds to WUR frame 250-1. Synchronization operation 314 then processes the received WUR frame 250-1 to synchronize to the symbol boundaries of the WFC symbols 520 that are included in the recovered WFC portion 268-1R of the WUR frame 250-1. In this regard, in some example embodiments synchronization operation 314 relies on WUR—Reference Signal 252 in received WUR frame 250-1 to allow WUR circuit 108 to synchronize sample timing to the incoming symbol boundaries of individual recovered WFC symbols 520 that are included within recovered WFC coded portion 268-1, enabling each of the recovered WFC symbols 520 to be sequentially processed by energy detection operation 316 and hard decision operation 318. In example embodiments, prior to or as an initial step in the power detection operation 316, the prepended GI is removed from the WFC symbol 520 being processed. The power detection operation 316 then measures the power distribution in each of first and second sub-symbols $SUB_1$ and $SUB_2$. By way of example, in one embodiment, power detection operation 316 is configured to sample the WFC symbol 520 at the same frequency used at waveform coding operation 306 (for example the conventional 20 MHz of 802.11) and process the WFC symbol 520R as follows: the first M samples (corresponding to duration $T_{gi}$) are discarded; an average power distribution value is determined for the next N/2 samples (corresponding to a duration of $T_u/2$) which represent sub-symbol $SUB_1$; and a further average power distribution value is determined for the next N/2 samples (corresponding to a duration of $T_u/2$) which represent sub-symbol $SUB_2$. In the example of a 20 MHz sampling rate and total symbol time of $T_{tot}$=4 µs the discarded GI includes M=16 samples, and first sub-symbol $SUB_1$ and second sub-symbol $SUB_2$ each include N/2=32 samples.

Decision block 318 is configured to compare the average power distribution values between the first and second sub-symbols $SUB_1$ and $SUB_2$ and make a corresponding data "0" or "1" decision. In the illustrated example, if the magnitude of the average power distribution value is greater in the first sub-symbol $SUB_1$ than the second sub-symbol $SUB_2$, then the received WFC symbol 520 is decoded as a data "1"; and if the average power magnitude value is greater in the second sub-symbol $SUB_2$ than the first sub-symbol $SUB_1$, then the received WFC symbol 520 is decoded as a data "0". The successive data bits from decision operation 318 are assembled to provide recovered FEC OOK data, with FEC decoding operation 320 being applied to generate recovered OOK source data 280-1R that corresponds to original OOK source data 280-1. The recovered OOK source data 280-1R may for example contain information and instructions for internal wake-up signal 154 for the main WLAN transceiver circuit 106 of station 104-1.

Stations 104-2 and 104-3 are similarly configured to recover their respective OOK source data 280-2R and 280-3R from the WUR data unit 200.

Although the WUR data unit 200 is shown as having three concurrent WUR Frames 250-1, 250-2, 250-3 appended to legacy preamble 210, the data unit 200 may include more or less than three WUR frames. In some embodiments, the number of WUR frames appended to legacy preamble 210 may be configurable. In some embodiments the bandwidth of the WUR frames and guard bands between them, and their frequency assignment within the bandwidth of legacy preamble 210, could be configurable. In some example embodiments, each WUR frame may have a bandwidth of 5 MHz or less.

The present disclosure may provide certain example algorithms and calculations for implementing examples of the disclosed methods and systems. However, the present disclosure is not bound by any particular algorithm or calculation.

Although the present disclosure may describe methods and processes with steps in a certain order, one or more steps of the methods and processes may be omitted or altered as appropriate. One or more steps may take place in an order other than that in which they are described, as appropriate.

Although the present disclosure may be described, at least in part, in terms of methods, a person of ordinary skill in the art will understand that the present disclosure is also directed to the various components for performing at least some of the aspects and features of the described methods, be it by way of hardware components, software or any combination of the two.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method of providing a wake-up signal in a communications channel for a plurality of receiving stations, comprising:
   generating at least a first series and a second series of waveform coded symbols, the first series being incorporated into a first wake-up-radio (WUR) frame that is intended for a first receiving station and has a first predefined bandwidth, the second series being incorporated into a second WUR frame that is intended for a second receiving station and has a second predefined bandwidth;
   combining the first and second WUR frames into a multiband WUR data unit having a bandwidth that is greater than a sum of the predefined bandwidths of the first and second WUR frames; and
   transmitting a wake-up signal including the multiband WUR data unit in the communications channel,
   wherein combining the first and second WUR frames into the multiband WUR data unit is performed in a synchronized sample-by-sample manner using a sampling rate that is the same as a sampling rate used for the waveform coded symbols of the first and second WUR frames.

2. The method of claim 1 wherein the first WUR frame and the second WUR frame each have a bandwidth of 5 MHz or less, wherein a frequency guard band is included between adjacent WUR frames.

3. The method of claim 1 wherein the multiband WUR data unit is appended to a legacy preamble symbol.

4. The method of claim 3 comprising transmitting a notification to each of the first and second receiving stations indicating the predefined bandwidth of the WUR frame intended for the receiving station.

5. A method of providing a wake-up signal in a communications channel for a plurality of receiving stations, comprising:
generating at least a first series and a second series of waveform coded symbols, the first series being incorporated into a first wake-up-radio (WUR) frame that is intended for a first receiving station and has a first predefined bandwidth, the second series being incorporated into a second WUR frame that is intended for a second receiving station and has a second predefined bandwidth;
combining the first and second WUR frames into a multiband WUR data unit having a bandwidth that is greater than a sum of the predefined bandwidths of the first and second WUR frames; and
transmitting a wake-up signal including the multiband WUR data unit in the communications channel,
wherein each waveform coded symbol in the first series is generated from applying waveform coding in time domain to a first orthogonal frequency division multiplexing (OFDM) waveform for which all subcarriers outside of the first predefined bandwidth have been set to zero; and
wherein each waveform coded symbol in the second series is generated from applying waveform coding in time domain to a second OFDM waveform for which all subcarriers outside of the second predefined bandwidth have been set to zero,
the method further comprising upconverting the multiband WUR data unit to provide the wake-up signal.

6. The method of claim 5 wherein the first and second OFDM waveforms are each generated from a 64 point IFFT and have a subcarrier spacing of 312.5 KHz,
wherein the first OFDM waveform includes 14 subcarriers within the first predefined bandwidth of which one subcarrier is set to zero and thirteen subcarriers have a non-zero value; and
wherein the second OFDM waveform includes 14 subcarriers within the second predefined bandwidth of which one subcarrier is set to zero and thirteen subcarriers have a non-zero value.

7. The method of claim 6 wherein of the thirteen non-zero subcarriers of each of the first and second OFDM waveforms, eight subcarriers are set to positive 1 and five subcarriers are set to negative 1.

8. A method of providing a wake-up signal in a communications channel for a plurality of receiving stations, comprising:
generating at least a first series and a second series of waveform coded symbols, the first series being incorporated into a first wake-up-radio (WUR) frame that is intended for a first receiving station and has a first predefined bandwidth, the second series being incorporated into a second WUR frame that is intended for a second receiving station and has a second predefined bandwidth;
combining the first and second WUR frames into a multiband WUR data unit having a bandwidth that is greater than a sum of the predefined bandwidths of the first and second WUR frames; and
transmitting a wake-up signal including the multiband WUR data unit in the communications channel,
wherein each of the waveform coded symbols represents a respective data bit and comprises a guard interval followed by first and second sub-symbols of equal duration, the corresponding data bit being represented by a different relative energy distribution between the first and second sub-symbols.

9. The method of claim 8 wherein the data bits are coded using on-off keying to represent data "1" and data "0" bits.

10. The method of claim 8 wherein the guard interval of each waveform coded symbol has substantially zero energy.

11. A method of providing a wake-up signal in a communications channel for a plurality of receiving stations, comprising:
generating at least a first series and a second series of waveform coded symbols, the first series being incorporated into a first wake-up-radio (WUR) frame that is intended for a first receiving station and has a first predefined bandwidth, the second series being incorporated into a second WUR frame that is intended for a second receiving station and has a second predefined bandwidth;
combining the first and second WUR frames into a multiband WUR data unit having a bandwidth that is greater than a sum of the predefined bandwidths of the first and second WUR frames;
transmitting a wake-up signal including the multiband WUR data unit in the communications channel, and
generating at least a third series and a fourth series of waveform coded symbols, the third series being incorporated into a third wake-up-radio (WUR) frame that is intended for a first receiving station and has a third predefined bandwidth, the fourth series being incorporated into a fourth WUR frame that is intended for a fourth receiving station and has a second predefined bandwidth; and
wherein the third and fourth WUR frames are combined with the first and second WUR frames into the multiband WUR data unit included in the wake-up signal.

12. A transmitter for transmitting a wake-up signal in a communications channel, comprising:
a waveform coding module configured to generate a multiband wake-up-radio (WUR) data unit including a first WUR frame that incorporates a first series of waveform coded symbols and occupies a first predefined bandwidth within a bandwidth of the multiband WUR data unit, and a second WUR frame that incorporates a second series of waveform coded symbols and occupies a second defined bandwidth within the bandwidth of the multiband WUR data unit, the bandwidth of the WUR data unit being greater than a sum of the predefined bandwidths of the first and second WUR frames; and
a modulator for up-converting the multiband WUR data unit onto a carrier frequency and transmitting a wake-up signal including the multiband WUR data unit in the communications channel,
wherein the waveform coding module is configured to combine the first and second WUR frames into the multiband WUR data unit in a synchronized sample-by-sample manner using a sampling rate that is the same as a sampling rate used for the waveform coded symbols of the first and second WUR frames.

13. The transmitter of claim 12 wherein the waveform coding module is configured to include a frequency guard band between the first and second WUR frames and edge bands at edge frequencies of the bandwidth of the multiband WUR data unit.

14. The transmitter of claim 12 wherein:
each waveform coded symbol in the first series is generated from applying waveform coding in time domain to OFDM subcarriers within the first predefined bandwidth; and
each waveform coded symbol in the second series is generated from applying waveform coding in time domain to OFDM subcarriers within the second predefined bandwidth.

15. The transmitter of claim 12 wherein the waveform coding module is configured to generate the multiband wake-up-radio (WUR) data unit to also include a third WUR frame that incorporates a third series of waveform coded symbols and occupies a third predefined bandwidth within a bandwidth of the multiband WUR data unit, and a fourth WUR frame that incorporates a fourth series of waveform coded symbols and occupies a fourth defined bandwidth within the bandwidth of the multiband WUR data unit.

16. A transmitter for transmitting a wake-up signal in a communications channel, comprising:

a waveform coding module configured to generate a multiband wake-up-radio (WUR) data unit including a first WUR frame that incorporates a first series of waveform coded symbols and occupies a first predefined bandwidth within a bandwidth of the multiband WUR data unit, and a second WUR frame that incorporates a second series of waveform coded symbols and occupies a second defined bandwidth within the bandwidth of the multiband WUR data unit, the bandwidth of the WUR data unit being greater than a sum of the predefined bandwidths of the first and second WUR frames; and
a modulator for up-converting the multiband WUR data unit onto a carrier frequency and transmitting a wake-up signal including the multiband WUR data unit in the communications channel,
wherein each of the waveform coded symbols represents a respective data bit and comprises a guard interval followed by first and second sub-symbols of equal duration, the corresponding data bit being represented by a different relative energy distribution between the first and second sub-symbols.

17. The transmitter of claim 16 wherein the data bits are coded using on-off keying to represent data "1" and data "0" bits.

18. The transmitter of claim 16 wherein the guard interval of each waveform coded symbol has substantially zero energy.

* * * * *